Feb. 27, 1968 W. G. CADY 3,371,234
PIEZOELECTRIC VIBRATORS AND SYSTEMS EMBODYING THE SAME FOR
CONVERTING THE MECHANICAL VIBRATION THEREOF INTO
ELECTRIC ENERGY
Filed Oct. 15, 1965
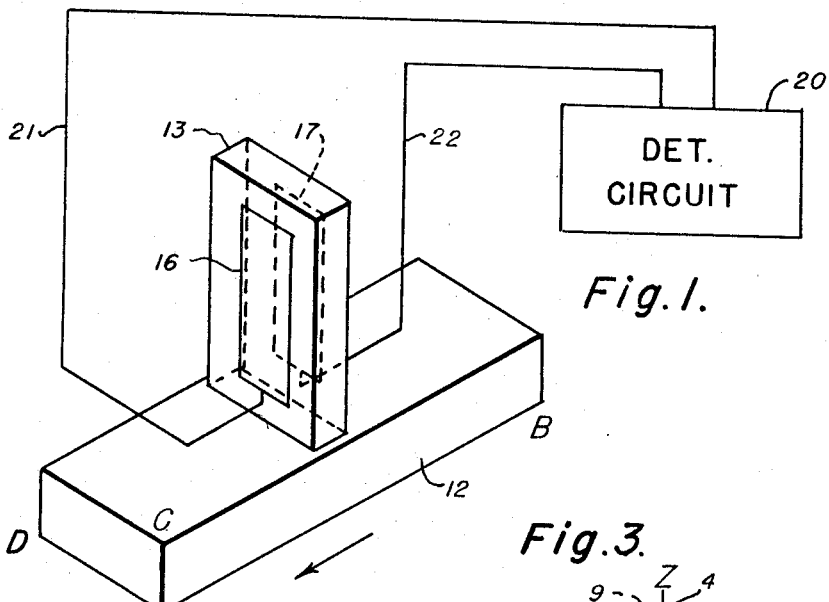
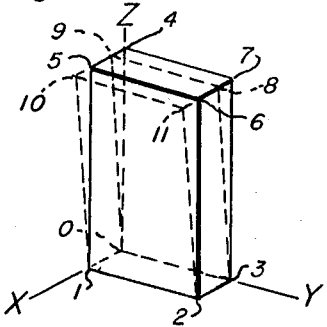
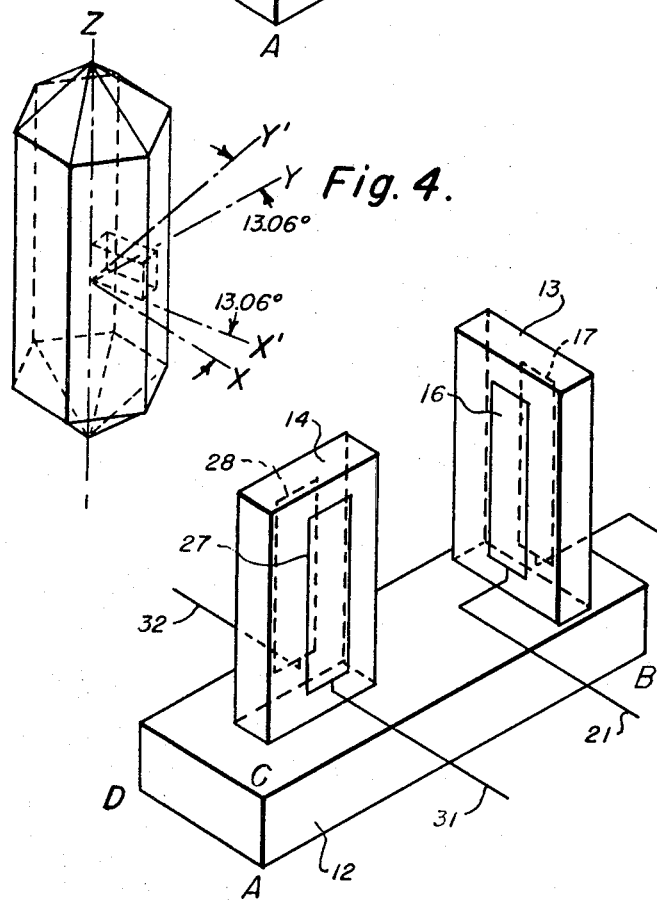
Inventor
Walter G. Cady
by Ruth and Ruth
Attorneys United States Patent Office 3,371,234
Patented Feb. 27, 1968

3,371,234
PIEZOELECTRIC VIBRATORS AND SYSTEMS EMBODYING THE SAME FOR CONVERTING THE MECHANICAL VIBRATION THEREOF INTO ELECTRIC ENERGY
Walter G. Cady, 127 Power St., Providence, R.I. 02906
Filed Oct. 15, 1965, Ser. No. 496,345
4 Claims. (Cl. 310—9.5)

The present invention relates to mechanical vibrators of the piezoelectric-quartz-crystal type, and to systems embodying them, for converting the mechanical vibration thereof into electric energy. The invention may be used, for example, to detect or sense the mechanical vibration or acceleration of any structure, such as an airplane, to which such quartz-crystal vibrators are attached.

An object of the invention is to provide a new and improved piezoelectric-quartz-crystal vibrator and a new and improved electric system of the above-described character embodying the same.

Another object is to provide a new and improved piezoelectric-quartz-crystal vibrator particularly adapted for shearing vibrations.

A further object of the invention is to provide a new and improved instrument and system of the above-described character employing a plurality of such piezoelectric-quartz vibrator or sensing elements that are mounted so as to be responsive to, or sense or detect mechanical vibration or acceleration of a base to which they are attached.

Other and further objects will be explained hereinafter and will be particularly pointed out in the appended claims.

With the above objects in view, a feature of the invention resides in a piezoelectric quartz crystal of parallelepiped shape, one end of which may be fastened to the before-mentioned structure. The length dimension of the crystal is substantially parallel to an X axis of the crystal and the breadth and thickness dimensions are disposed substantially +13 degrees with respect to the corresponding Y- and Z-axes of the crystal. The construction and orientation or other positioning of the piezoelectric-quartz-crystal vibrator or sensing element is such that it will vibrate or become strained, and thereby respond electrically to vibration or acceleration of the base.

The invention will now be described more fully in connection with the accompanying drawings, in which FIG. 1 is a schematic isometric view of a base to which a piezoelectric-quartz-crystal vibrator embodying the present invention is shown attached;

FIG. 2 is a similar view of a modification;

FIG. 3 is a diagrammatic view explanatory of certain aspects of piezoelectric shear; and FIG. 4 is a diagrammatic view illustrating the direction of the cut of the piezoelectric-quartz-crystal vibrator of the present invention, with reference to the original crystal.

A base 12 is shown as a rigid rectangular frame, which may be rigidly secured to, or may itself represent, an airplane or other vibratory or accelerating object. A vibratory or sensing element, constituted of an elongated parallelepiped-shaped flat piezoelectric-quartz-crystal bar or plate 13, shown rectangular in cross-section, is shown fastened at its lower end, as by means of cement or other securing means, to the base 12. The upper end of the crystal 13 is shown free, but it may, if desired, carry a weight, such as of metal, as an inertial load, to lower the natural frequency of its vibration. The length of the bar 13 is large compared to its other dimensions and its breadth is shown greater than its thickness.

A pair of oppositely disposed faces of the crystal are shown provided with a pair of oppositely disposed conducting electrodes 16 and 17, disposed in parallel planes. The electrodes 16 and 17 should preferably cover the entire faces of the crystal to which they are respectively attached. The pair of electrodes 16 and 17 may be connected, by means of lead lines 21 and 22, to an electric system 20, in a manner well known. The electric system 20 may, for example, be a detecting circuit, the response of which is proportionate to the intensity of the particular vibration or acceleration involved of the base 12.

Since the electric system 20 is a detecting circuit, it does not impress any voltage upon the vibrator 13 from an outside source of voltage. The vibrator 13 is therefore normally in a state of rest.

It becomes deformed, however, and its upper end becomes moved, with respect to the base 12, in a direction at right angles to its length dimension in response to vibration or acceleration of the base 12 either to the right or the left as indicated by the arrow of FIG. 1.

As hereinafter more fully explained, the bar 13 is moved, according to the present invention, by shear. In order to utilize the shear effect, the bar 13 should be cut from the mother crystal in a particular manner, illustrated by FIG. 4, and described more fully hereinafter. With a piezoelectric-quartz crystal so properly cut and properly oriented with respect to the crystallographic axes, and suitably mounted on the frame 12, it will respond to one component of motion of the frame 12, but not to the other two components. Any periodic motion of the base 12 in the left-right direction AB will cause flexural vibration of the plate 13, as indicated by the dotted lines of FIG. 3. For example, the face 4–5–6–7 may move to the position 8–9–10–11. The said dotted lines are shown straight though, in actual fact they are slightly curved in a manner characteristic of flexure.

With the piezoelectric plate 13 so designed to vibrate in response to shear, if the base 12 is accelerated to the left, as indicated by the arrow in FIG. 1, the plate 13 becomes sheared to the right, in the plane of the lines AB and AC, and vice versa. When the base 12 vibrates to right and left at any given frequency, the plate 13 undergoes alternating shear at the same frequency, thereby generating an alternating potential difference between the two opposite electrodes 16 and 17.

The terms shear and compression are well known in the art, as explained, for example, in my book on Piezoelectricity (Dover Publications, Inc., New York, 1964), pages 46–52, particularly with reference to FIG. 14, on page 52. They may be defined as follows:

A shear is the type of strain in which a rectangle becomes deformed into an oblique parallelogram, without change in length of the sides. A compression, or its opposite, an extension, is the type of strain in which a rectangle subjected to a force in the direction of its length suffers a change in length.

The nature of a shear is illustrated in FIG. 3, in which the rectangular block 0–1–2–3–4–5–6–7 is deformed by a shear into the shape 0–1–2–3–8–9–10–11.

FIG. 1 shows the device when not strained. If the base 12 is accelerated to the left, as indicated by the arrow in FIG. 1, the sensing element 13 becomes sheared to the right, in the plane of the lines AB and AC, and vice versa. A potential difference or electric polarization is generated between the pair of electrodes 16 and 17, proportional to the vibration or acceleration of the base 12 in the left-right direction.

As disclosed more particularly in my copending application, Ser. No. 496,346, filed Oct. 15, 1965, and in my said book on Piezoelectricity, pages 187, 190–192, when a piezoelectric crystal of the most general type is strained in any one of the six possible ways it becomes electrically polarized. The polarization has components $P_1$, $P_2$, $P_3$ parallel to the X-, Y- and Z-axes of the crystal. The general equation is $P_m = e_{mh} S_h$, where $m = 1, 2,$ or 3, and $h = 1, 2, \ldots 6$. $e_{mh}$ is one of the eighteen piezoelectric stress-coefficient; $S_h$ is a component of strain. Nine of the eighteen piezoelectric coefficients correspond to compression, and the other nine to shear.

These nine shear coefficients form the following matrix:

$$\begin{matrix} e_{14} & e_{15} & e_{16} \\ e_{24} & e_{25} & e_{26} \\ e_{34} & e_{35} & e_{36} \end{matrix}$$

In all but the triclinic hemihedral class some of the coefficients vanish. The first subscript of $e$ indicates the direction of the polarization parallel to the respective X-, Y-, and Z-axes; the second subscript indicates the type of strains in the YZ-, ZX- and XY-, planes respectively. They occur in the matrix shown above.

A preferred method of cutting the vibrator 13 is illustrated by FIG. 4. The length of the vibrator 13 is assumed to be along, or parallel to, the X-axis of the mother quartz crystal. It may be assumed also that the breadth of the crystal is parallel to the Z-axis. If the thickness were parallel to the Y-axis, and using the piezoelectric coefficient $e_{26}$, there would be a very small disturbance present due to $e_{25}$.

In any application of piezoelectricity, there is usually some one constant that is to be utilized. In the present instance, a shear $S_6$ is impressed to produce an electric field parallel to Y, wherefore the coefficient $e_{26}$ is applicable. But quartz has also a constant $e_{25}$, which means that the strain $S_5$, if present, will also produce a field parallel to Y. But cutting the faces of the plate from the mother crystal so that they make an angle of 13.06° with the natural Y- and Z-axes, $e_{25}$ becomes equal to zero.

This angle may be obtained by setting $e'_{25}$ equal to zero in Eq. 221, page 212 of my book, and solving for $c$ and $s$, which are the cosine and sine of the angle of rotation.

The disturbing effect before-mentioned can be eliminated, therefore, by cutting the plate from the parent crystal in such a way that the thickness lies in a direction Y' making an angle of +13.06° with the Y-axis of the crystal. It is assumed that angles are called positive when laid off counter-clockwise for right-quartz, clockwise for left-quartz. The direction of breadth makes the same angle with the Z-axis, while the length remains in the X-direction. The result is what is commonly called a plate that is rotated through +13.06° about the X-axis. As before stated, as a consequence of the rotation, the coefficient $e_{25}$ assumes a new value $e'_{25} = 0$, while the new value $e'$ assumed by $e_{26}$ is practically unchanged.

It is therefore one advantage of this invention that, if quartz is employed, use can be made of the relatively large value of $e_{26}$.

Since the breadth of the plate 13 is greater than its thickness, as shown, the plate will respond effectively to vibrations in only one direction, instead of two. To detect vibrations in both directions two such plates can be mounted on the same base, as illustrated by FIG. 2, one being at right angles to the other. The base 12 will then respond simultaneously and independently to two mutually perpendicular components of the motion, in the directions of the lines AB and AD, translating each of these components into electrical signals. A shear at right angles to the plane of the lines AB and AC, in the plane of the lines AC and AD, produces the same effect that has been described above.

Modifications will occur to persons skilled in the art, and all such are considered to fall within the spirit and scope of the present invention, as defined in the appended claims.

What is claimed is:

1. A rectangular prism of piezoelectric quartz, the length dimension of which is substantially parallel to an X axis of the crystal and the breadth and thickness dimensions of which are disposed substantially +13 degrees with respect to the corresponding Y and Z axes of the crystal.

2. An instrument for responding to the mechanical vibration or acceleration of a base comprising a rectangular prism of piezoelectric quartz fastened at one end to the base, the length dimension of which is substantially parallel to an X-axis of the crystal and the breadth and thickness dimensions of which are disposed substantially +13 degrees with respect to the corresponding Y- and Z-axes of the crystal, whereby the crystal will bend to produce an alternating shearing strain, and thereby generate an electric polarization in response to vibration or acceleration of the base.

3. A system for converting the mechanical vibration or acceleration of a base into electric energy of an electric detecting circuit comprising a parallelepiped-shaped piezoelectric quartz crystal fastened at one end to the base, the length dimension of which is substantially parallel to an X-axis of the crystal and the breadth and thickness dimensions of which are disposed substantially +13 degrees with respect to the corresponding Y- and Z-axes of the crystal, and means for connecting the crystal with the detecting circuit.

4. A system for converting the mechanical vibration or acceleration of a base into electric energy of an electric detecting circuit comprising two piezoelectric quartz crystals, each fastened at one end to the base, the length dimension of each of which is substantially parallel to an X-axis of the crystal and the breadth and thickness dimensions of which are disposed substantially +13 degrees with respect to the corresponding Y- and Z-axes of the crystals, the crystals being disposed on the base with their width and thickness dimensions respectively at right angles to each other.

References Cited

UNITED STATES PATENTS 2,574,257  11/1951  Franklin.
2,472,753  6/1949  Mason.
2,472,715  6/1949  Mason.

MILTON O. HIRSHFIELD, *Primary Examiner.*

J. D. MILLER, *Assistant Examiner.*